United States Patent
Souza et al.

[11] 3,834,063
[45] Sept. 10, 1974

[54] LIVE ANIMAL TRAP

[75] Inventors: Anthony J. Souza, Lancaster; Harlan W. Martin, New Holland, both of Pa.

[73] Assignee: Woodstream Corporation, Lititz, Pa.

[22] Filed: May 9, 1972

[21] Appl. No.: 251,790

[52] U.S. Cl. .................................. 43/61, 43/70
[51] Int. Cl. .................................. A01m 23/02
[58] Field of Search ..................... 43/61, 60, 70

[56] References Cited
UNITED STATES PATENTS
| | | | |
|---|---|---|---|
| 1,815,541 | 7/1931 | Bohannon | 43/61 |
| 3,624,951 | 12/1971 | Gilbaugh | 43/61 |

FOREIGN PATENTS OR APPLICATIONS
| | | | |
|---|---|---|---|
| 520,308 | 4/1940 | Great Britain | 43/61 |

*Primary Examiner*—Louis G. Mancene
*Assistant Examiner*—J. O. Lever
*Attorney, Agent, or Firm*—Holman & Stern

[57] ABSTRACT

A novel live animal trap is disclosed of the type comprising a box-like cage having opposed substantially parallel pairs of sides, a separate removable top and a floor, with a passage for entrance and egress preferably in each end of the cage. A foldable door is disposed in each passage, the door being movable between a folded or collapsed configuration to open the passage and an unfolded configuration to close the associated passage with the door normally being biased or urged into the unfolded configuration. A triggering device is disposed within the cage and is connected to linkage means, disposed exteriorly of the cage, the linkage means being operatively coupled to each door. When the triggering device is in a "cocked" or set position, the linkage means can selectively retain each door in a folded configuration to keep the associated passage open. When the triggering device is tripped such as by an animal entering into the cage, each retained door is released through the linkage means whereby the door quickly unfolds and snaps shut so as to trap the animal. The novel trap of the instant invention is constructed in a "knock-down" manner whereby the cage, as a whole, can be collapsed upon removal of the top to facilitate transportation thereof.

12 Claims, 6 Drawing Figures

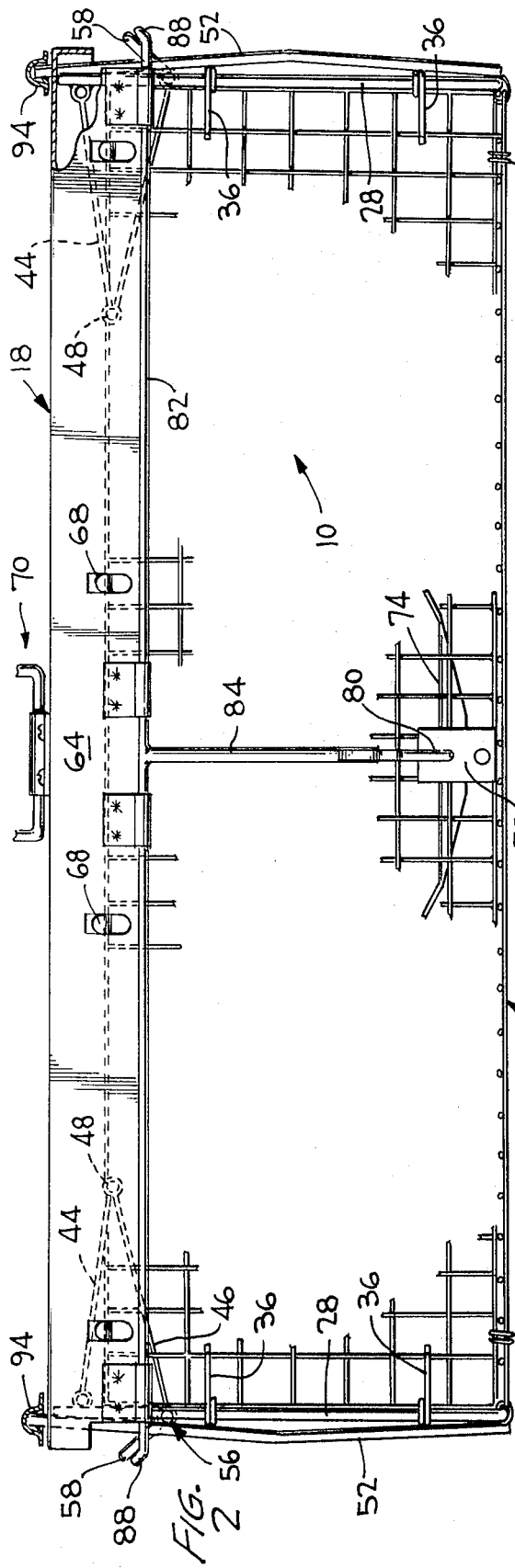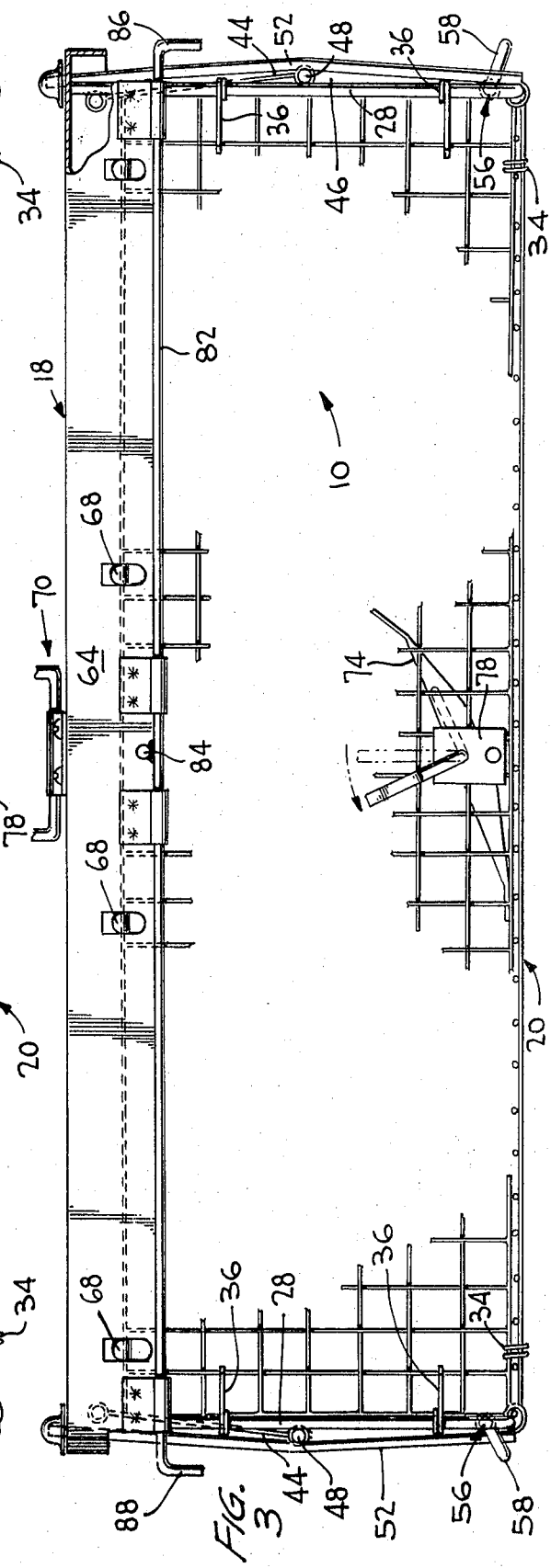

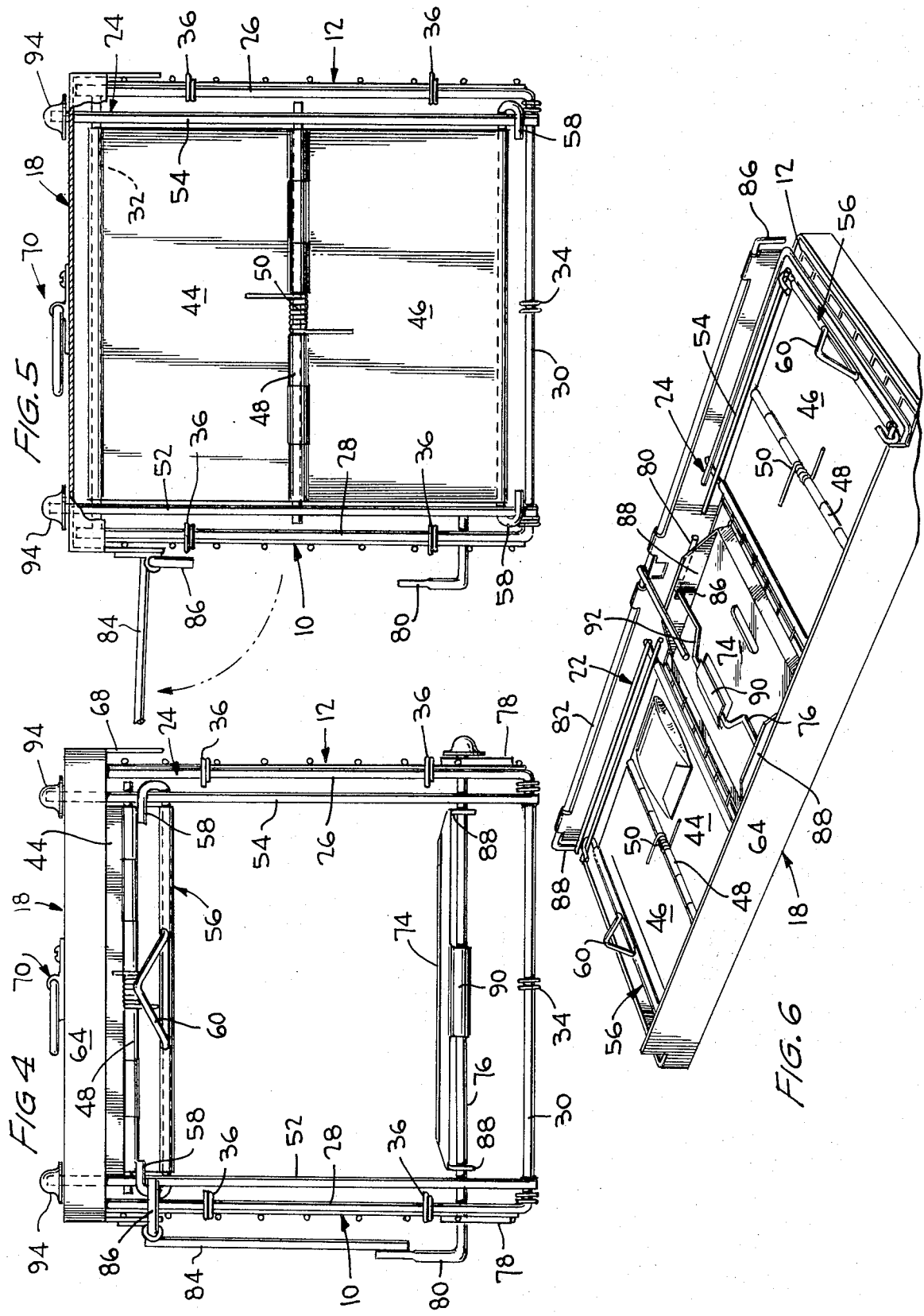

{ 3,834,063 }

LIVE ANIMAL TRAP

BACKGROUND OF THE INVENTION

This invention generally relates to animal traps and is particularly concerned with a so-called "live" animal trap of the type wherein an animal is trapped unharmed within a cage.

Many techniques and portable apparatus exist which effect the general function of trapping or holding animals such as squirrel, rabbit and the like. Typical or such traps are those which utilize spring-jaw arrangements which, when triggered, serve to snap shut upon an extremity such as a leg of the animal, oftentimes severely injuring the animal in the process. Another variety of traps are the so-called live animal traps which, by and large, comprise a cage serving to trap any animal that wanders thereinto in a fashion whereby the animal is totally unharmed. Traps of this latter type have enjoyed increasingly wide spread use due to their inherent humane characteristics.

Such live animal traps of the prior art generally comprise a box-like cage having at least one opening or passage therein, the opening being selectively sealed or closed by a door through operation of a triggering device placed within the cage and upon which bait such as food is placed. Accordingly, an animal lured through the opening of the cage by bait placed on the triggering device will subsequently trigger the triggering device which closes the door and serves to seal off the opening behind the animal, thus trapping the animal unharmed within the cage.

Certain disadvantages exist, however, with respect to prior art live animal trap constructions. For example, it is obvious that the cage door must be quickly operative with a snap-action closing upon actuation of the triggering device so as not to allow the animal time to escape. Mechanisms utilized by the prior art to achieve this necessary function have usually been extremely complex and prone to failure. Additionally, the triggering device or mechanism utilized must be fail-safe in operation and must be sensitive to movement by the animal. On the other hand, the triggering operation cannot be overly sensitive for fear that simple jarring of the trap could accidentally effect closing of the door, thus rendering the interior of the trap inaccessible to animals. Prior art traps of this general type normally do not satisfactorily provide a trigger mechanism which operates in accordance with these requisite expectations. Additionally, when a so-called live animal trap of the type having a plurality of openings and doors is utilized, the trigger mechanisms of prior art cage constructions have been unable to reliably and simultaneously control the release of the plurality of doors. Further, due to the typical trigger construction of the prior art, it is difficult to set the trigger of such multi-door traps in a facile manner.

Continuing, live animal traps, as opposed to the conventional spring-jaw type of trap, are bulky in size and, due to such bulk, are difficult to ship or otherwise transport from one location to another. No provision has been made in the prior art relative to reducing the shipping bulk of such traps, or otherwise modifying the construction of such traps so as to solve this transportation problem.

SUMMARY OF THE INVENTION

With the above background in mind, it should be apparent that a need exists in this art for the provision of a live animal trap of the type generally described, which trap does not exhibit the disadvantages of prior art constructions. In this respect, it is the primary objective of the instant invention to provide such an improved live animal trap.

A further, more specific, yet important objective of the instant invention concerns the provision of an improved live animal trap which utilizes an entirely novel construction of the cage door whereby operation of the cage door is sure, reliable, and virtually instantaneous.

Yet another objective of the instant invention related to that presented immediately above concerns the provision of an improved live animal trap having a door therefor which effectively resists any attempt by an animal caught within the cage to escape.

An additional objective of the instant invention concerns the provision of an improved live animal trap wherein the trigger mechanism and linkage therefor can be easily and reliably set, even when multiple door arrangements of the cage are used.

Still another objective of the instant invention concerns the provision of an improved live animal trap which is of a so-called "knock-down" construction and is thereby collapsible so as to facilitate shipment and other transport thereof.

These objects as well as others which will become apparent as the description proceeds are implemented by the instant invention, which, as aforestated, comprises a live animal trap of the general type defining a box-like cage having opposed substantially parallel pairs of sides, a top and a floor, with a passage for entrance and egress to and from the cage in at least one of the sides. The instant invention contemplates the provision of a foldable door means which is disposed in the passage, the door means being movable between a folded or collapsed configuration wherein the passage is open and an unfolded configuration wherein the passage is closed, the door means normally being urged into the unfolded configuration by a biasing means such as a spring or gravity. Disposed within the cage is a novel trigger mechanism or means which has a cocked and a tripped position, with linkage means of novel construction coupling the trigger means to the door means such that the door means is retained in the folded configuration against the action of the biasing means when the trigger means is cocked, the trigger means, when tripped such as by an animal within the cage, quickly releasing the door means through the linkage means whereby the door means snaps shut so as to trap the animal unharmed in the cage.

The folded construction of the novel door means of the instant invention facilitates quick snap-action closing of the door, and further provides an unusual advantage in that pressure exerted against the door from the inside of the cage by an animal trapped therein only serves to increase the sealing force of the door so as to defeat any attempt at escape. In this respect, and in the preferred inventive embodiment, a door means will be seen to comprise planar sections which are hingedly connected together along a fold axis with one of the sections being further hingedly coupled to the cage, the sections of the door means being substantially coplanar such that the passage into the cage is closed when the door means is the unfolded configuration. Guide means are provided in the passage for slidably guiding the door means between the folded and unfolded configurations thereof such that the door means is only collapsible inwardly towards the interior of the cage about the fold axis. Thus, outward pressure on the door means cannot open the door, but can only increase its sealing or closing action.

In the preferred inventive embodiment, the top portion of the cage is removable and each of the cage sides are hingedly attached to the bottom. Thus, the trap of the instant invention is virtually completely collapsible upon removal of the top such that each of the sides can be folded in superposition over the bottom.

The trigger mechanism or device of the instant invention will be seen to comprise a pan which, in the preferred inventive embodiment, is hingedly disposed for rocking movement between two opposing sides of the cage above the floor. The linkage coupled between the trigger mechanism and the door or doors in the event that multiple doors are provided comprise a lever arm which is rigidly connected to the pan and which extends exteriorly of the cage. A single latching rod is disposed exteriorly of the cage and is coupled to the lever arm, the latching rod being operative upon any movement of the lever arm to swing from a latching position wherein all of the multiple door means are maintained in a folded configuration, to an unlatching position wherein all of the door means are released. It should be noted that, while cocking the trigger means, an operator of the trap can maintain each of the multiple doors in an open position simply through manipulation of the single latching rod disposed exteriorly of the cage. This greatly facilitates setting of the trap.

BRIEF DESCRIPTION OF THE DRAWINGS

The invention will be better understood and additional features and advantages hereof will become apparent from the following detailed description of a preferred inventive embodiment, such description making reference to the appended sheets of drawings, wherein:

FIG. 2 is a side plan view of the novel trap of the instant invention depicting the triggering mechanism and linkage in a cocked or latching state;

FIG. 3 is a plan view of the live animal trap depicting the trigger mechanism and various linkage in a tripped or released state;

FIG. 4 is an end elevational view of the novel trap of the instant invention depicting the door means therefor in a folded or collapsed configuration whereby a passage into the cage is open;

FIG. 5 is an end elevational view of the novel trap depicting the door means therefor in a released and unfolded configuration due to action of the triggering mechanism, the passage into said cage thereby being closed; and FIG. 6 is a perspective illustration of the novel trap of the instant invention in a broken-down or collapsed state for facilitating transport thereof.

Throughout the several views of the drawings, like parts have been denoted by the same reference numerals.

DETAILED DESCRIPTION OF A PREFERRED INVENTIVE EMBODIMENT

Figure 1:
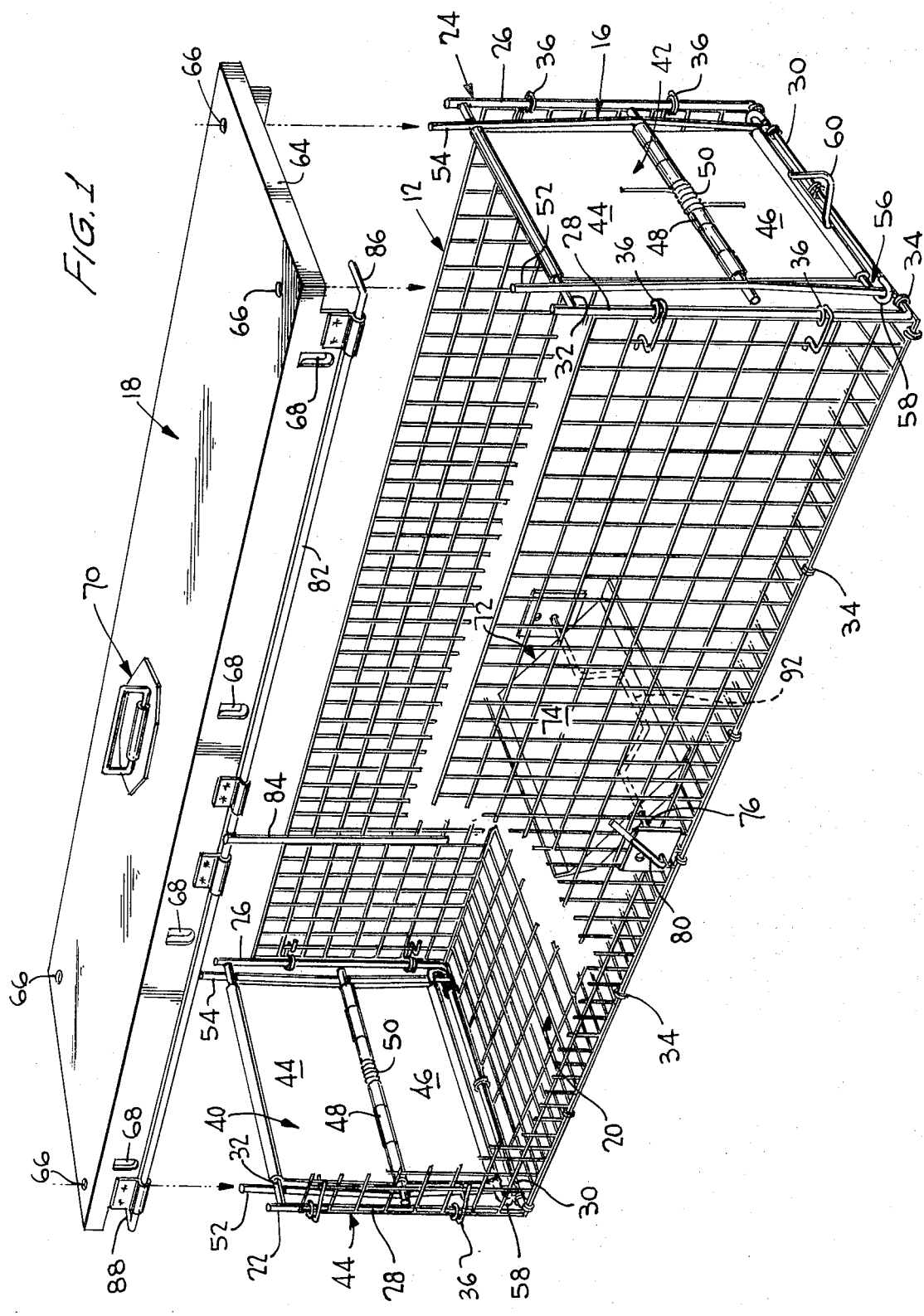
FIG. 1 is a perspective illustration of the novel live animal trap of the instant invention, partially disassembled for illustrative clarity.

Referring now to the drawings and particularly to FIG. 1 thereof, the novel live animal trap of the instant invention will be seen to comprise a box-like cage having opposed substantially parallel pairs of sides such as sides 10 and 12, and 14 and 16, respectively, and a top generally designated by reference numeral 18. In the preferred inventive construction as shown, the cage generally comprises a rectangular box with opposing parallel sides 14 and 16 defining the conventional ends of such box. Each of the sides 10 and 12 as well as the floor 20 of the cage are constructed of mesh-like wire, such as chicken wire, whereas the top 18 of the cage is constructed of sheet metal, or the like.

A rectangular wire supporting frame generally designated by reference numerals 22 and 24 are respectively provided about the periphery of each of the two sides or ends of the cage 14 and 16, each frame having two vertically upstanding parallel wire posts 26 and 28, as well as two horizontally disposed and parallelly spaced wire supports 30 and 32. Wire frames 22 and 24 give structural support to the box-like cage in its assembled configuration as is depicted in FIG. 1.

Each of the side walls 10 and 12 as well as the lower horizontally disposed supports 30 of wire frames 22 and 24 are hingedly coupled to the bottom or floor 20 of the cage by means of clamps 34 disposed about the periphery of the various sides and the floor. Accordingly, each of the sides of the cage is collapsible and can fold in superposition over the floor 20 so as to facilitate transport of the cage, as will be discussed in more detail with respect to the configuration of FIG. 6.

In an erected configuration, however, as depicted in FIG. 1, the various sides 10 and 12 as well as sides 14 and 16 are maintained in a substantially upright position to form the rectangular cage by means of hooks 36 serving to secure each of the sides 10 and 12 to the vertically extending parallel wire posts or rods 28 of wire frames 22 and 24.

A passage for entrance and egress to and from the interior of the cage is provided in at least one, and preferably in both of the sides 14 and 16. Foldable door means generally designated by reference numerals 40 and 42 are disposed in each passage. In the preferred inventive embodiment, each of the door means 40 and 42 will be seen to comprise planar sections 44 and 46, these sections being hingedly connected together along a fold axis 48. Each of the door means 40 and 42 are movable between a folded and collapsed configuration such as depicted in FIGS. 2 and 4 wherein the passage in the sides of the cage is open, and an unfolded configuration such as is depicted in FIGS. 3 and 5 wherein the passage in either end of the cage is closed. Door means 40 and 42 are normally urged or biased into the unfolded configuration depicted in FIG. 1 via biasing means, such as spring 50, therefor. It should be appreciated, however, that spring 50 may be eliminated and door means 40 and 42 would thereby operate under the biasing effect of gravity in the manner to be described hereinbelow.

During folding and unfolding motion of the door means 40 and 42, such door means are guided by guide means comprising a pair of elongated parallel vertical bars 52 and 54 associated with each of the wire frames 22 and 24, respectively. The elongated vertical bars 52 and 54 are bowed outwardly and are welded or otherwise fixedly attached at their upper ends thereof to the horizontal wire support 32 of frame members 22 and 24 and are welded or otherwise fixedly attached at their lower ends thereof to the horizontal wire support 30 of frame 22 and 24. As mentioned above, the upper section 44 of each of the door means 40 and 42 is hingedly attached about the horizontal wire support 32 of each frame and the other section 46 of each of the door means 40 and 42 is loosely clamped about the vertical bars 52 and 54 by means of a horizontally disposed wire member 56 having hooks or eyes 58 at each of the ends thereof adapted to slidably encircle the vertical bars 52 and 54, the wire member 56 having a bent tab portion 60 by which the folding of the door 40 and 42 can be hand manipulated in a manner to be discussed.

The top 18 of the cage of the instant invention preferably is stamped from sheet metal, for example, so as to have a planar portion 62 and downwardly depending sides 64. A plurality of apertures 66 are disposed in the area near each of the corners of the top 18 through the planar surface 62 thereof, these apertures receiving the upwardly extending ends of the vertical bars 52 and 54 defining the guide means discussed above. The downwardly depending side 64 of the top 18 includes a plurality of stamped tabs, such as tabs 68 which, when the top portion 18 is moved downwardly such that the vertical bars 52 and 54 extend through the apertures 66 thereof, serve to engage the upper portion of the mesh side walls 10 and 12 of the cage so as to give the cage structural strength and so as to prevent the side walls 10 and 12 from bowing inwardly. A carrying handle generally designated by reference numeral 70 is further disposed on the planar surface 62 of the top 18.

Trigger means generally designated by reference numeral 72 are disposed within the cage and, in the preferred inventive embodiment, will be seen to comprise a pan 74 disposed about an axel 76 for rocking movement between the two opposing sides 10 and 12 of the cage. Axel 76 is pivotally mounted through bearing plates disposed on each of the side walls 10 and 12 and terminates in a lever arm 80 which extends exteriorly of the cage. Axel 76 and its terminating lever arm 80 are rigidly attached to the pan 74 such that when the pan 74 is rocked or moved, lever arm 80 likewise moves along an arcuate path.

Lever arm 80 as well as an elongated rod 82 hingedly disposed to the depending side walls 64 of the top 18 form a linkage mechanism coupling the trigger or pan 74 to the various door means 40 and 42 in a manner to be described. It should be recognized that the elongated rod 82 has a downwardly depending stub section 84 which cooperates with the upwardly extending lever arm 80 as will be described, as well as two inwardly directed legs 86 and 88 to either end thereof, which legs will be seen to cooperate with the bent or clamped hooks 58 of wire member 56 associated with the lower planar section 46 of each of the door means 40 and 42. The exact manner of operation, i.e., setting and triggering of the trap as above-described will be discussed hereinbelow. At this juncture, however, it will be useful to describe the knock-down or collapsible features of the cage assembly which assists in shipping or other transport thereof.

In this respect, attention is now specifically directed to FIG. 6 of the appended drawings wherein the cage of the instant invention is illustrated in its collapsed or knock-down configuration for shipping. Each of the side walls 10 and 12 as well as the door means 40 and 42 have been collapsed and folded inwardly in superposition over the bottom 20 of the cage after removal of the triggering means comprising the pan 74 and its associated axel 76. The collapsed sides and door means are then disposed within the top 18 of the cage after top 18 has been turned over so as to define a container. The trigger means comprising the pan 74 and its associated axel 76 are then disposed over the collapsed sidewalls and door means within the container or tray defined by the top 18 of the cage. The entire collapsed assembly is extremely compact and, as can be appreciated, is relatively easy to ship or transport.

A user of the cage of the instant invention would therefore receive same substantially in the configuration depicted in FIG. 6 of the appended drawings. Assembly of the cage into the configuration depicted in FIG. 1 is likewise readily accomplished. Initially, the side walls 10 and 12 as well as the door means 40 and 42 are unfolded into an upright position about the various clamps 34 defining a hinging mechanism. The axel 76 is then threaded through apertures 86 provided in depending skirt portions 88 of the pan 74 and is maintained in a rigid position with respect to pan 74 by means of a tab 90 under which a bent portion 92 of the axel is placed as illustrated by the dotted lines of FIG. 1. The ends of rod 76 are then passed through the apertures provided in each of the plates 78 disposed in side walls 10 and 12 so as to effect the hinge mounting of the pan 74 between the opposing side walls 10 and 12. Hooks 36 are then fixed between the various abutting peripheral sections of the cage sides and the top 18 of the cage assembly is then lowered into place such that the ends of the elongated vertical bars 52 and 54 fit through apertures 66 therein. Top 18, once positioned, is maintained in place through the utilization of finger nuts 94 and the side walls 10 and 12 of the cage are prevented from bowing in at the upper section thereof due to their engagement by tabs 68 in the depending side walls 64 of the top 18. The trap is now ready to be set in the following manner.

Bait is initially placed and secured to the trigger pan 74. The door means 40 and 42 are then pushed inwardly about the fold axis 48 and lifted by the operator of the cage by the outwardly extending tab 60 coupled to the lower planar section 46 of each door. In this fashion, each of the doors 40 and 42 are moved upwardly with the fold axis 48 extending inwardly into the cage, each of the door means 40 and 42 assuming the folded configuration such as depicted by the dotted lines of FIG. 2. Thereafter, the elongated rod 82 comprising the linkage as above-discussed and hingedly disposed to the downwardly depending walls 64 of the top 18 is then moved into a position such that the stub portion 84 is vertically disposed and such that the end legs 86 and 88 are horizontally directed toward the opposing side of the cage. In this position, the extending tabs 86 and 88 engage underneath the bent clamping portions or hooks 58 of the rod 56 through the lower planar section 46 of each door means in this folded configuration against the action of the spring biasing means 50, simply through the utilization of one hand holding the downwardly depending stub 84 in a vertical position. The lever arm 80 and the trigger pan 74 to which the lever arm 80 is rigidly affixed is then moved with the other hand of the cage operator so that lever arm 80 likewise assumes a vertical position as depicted in FIGS. 2 and 4 of the appended drawings immediately on the inside of lever arm 80, the mating sections of the lever arm 80 and downwardly depending stub 84 of rod 82 being machined so as to define corresponding curvilinear surfaces.

The operator of the cage would subsequently let go of the downwardly depending stub 84 and, the downward pressure exerted on each of the legs 86 and 88 of the rod 82 by the urging of spring means 50 of each of the doors 40 and 42 tends to move the elongated rod 82 in a clockwise direction, which clockwise motion tends to urge the depending stub 84 to swing towards the left as viewed in FIG. 5 of the appended drawings. Swinging motion of the downwardly depending stub 84 is prevented, however, due to its engagement with the upwardly extending lever 80 of the pan 74 and this spring pressure merely serves to seat the stub 84 upon the lever 80. The trap of the instant invention is now in a set or cocked condition as depicted in FIGS. 2 and 4 of the appended drawings.

When an animal enters the cage through the open door means 40 and 42, lured by the bait attached to the trigger mechanism 72, any rocking motion of the pan 74 such as would be caused by the animal is effective to trip the lever 80. Specifically, a rocking motion of pan 74 serves to swing the lever arm 80 either to the right or to the left such as depicted in FIG. 3 of the appended drawings. In this position, the stub portion 84 of the elongated rod 82 no longer is in a mating relationship underneath the lever 80. As such, the downward pressure exerted upon each of the end legs 86 and 88 of the elongated rod 82 serves to effect clockwise rotation of rod 82 as depicted in FIG. 5 of the appended drawings. With such clockwise rotation, the end legs 86 and 88 no longer engage underneath the bent clamps or hooks 58 of wire 30 of each of the door means 40 and 42, and thus the door means 40 and 42 quickly slide downwardly about the vertical elongated guide bars 52 and 54 into an unfolded or closed configuration such as depicted in FIGS. 1 and 5 of the appended drawings. The animal within the cage of the instant invention is now trapped and it should be appreciated that, due to the above-described mounting of the doors 40 and 42, any pressure exerted on such doors from the inside of the cage by the trapped animal only serves to effect a better seal and closing of the cage.

It should be apparent from the foregoing detailed description that the objects set forth hereinabove have been successfully achieved. Moreover, while there is shown and described present preferred embodiments of the invention, it is to be distinctly understood that the invention is not limited thereto but may be otherwise variously embodied and practised within the scope of the following claims. Accordingly,

What is claimed is:

1. A live animal trap comprising a box-like cage having opposing substantially parallel pairs of sides, a top and a floor, with a passage for entrance and egress to and from said cage in at least one of said sides; foldable door means disposed in said passage, said door means being movable between a folded and collapsed configuration herein said passage is open and an unfolded configuration wherein said passage is closed, said door means normally being urged into said unfolded configuration via biasing means therefor; trigger means having a cocked and a tripped position disposed with said cage, and linkage means disposed outside said cage for coupling said trigger means to said door means such that said door means is retained in said folded configuration against the action of said biasing means when said trigger means is cocked, said trigger means, when tripped such as by an animal within said cage, releasing said door means through said linkage means, whereby said door means snaps shut so as to trap the animal, wherein said trigger means comprises a pan hingedly disposed for rocking movement between two opposing sides of said cage above said floor, said linkage comprising a lever arm rigidly connected to said pan and extending exteriorly of said cage, and a single latching rod disposed exteriorly of said cage along one side thereof and coupled to said lever arm, said latching rod being operative upon any movement of said lever arm to swing from a latching position wherein said door means is released.

2. A trap as defined in claim 1, wherein said single latching rod is pivotally mounted to the top of said cage.

3. A trap as defined in claim 2, wherein a passage is provided in two opposing sides of said cage and wherein two door means are provided, one in each passage, said linkage means coupling said trigger means to each of said door means.

4. A live animal trap comprising a box-like cage having opposing substantially parallel pairs of sides a separate top, and a floor, with a passage for entrance and egress to and from said cage in at least one of said sides; foldable door means disposed in said passage, said door means being movable between a folded and collapsed configuration wherein said passage is open and an unfolded configuration wherein said passage is closed, said door means normally being urged into said unfolded configuration via biasing means therefor; trigger means having a cocked and a tripped position disposed in said cage, and linkage means therefor coupling said trigger means to said door means such that said door means is retained in said folded configuration against the action of said biasing means when said trigger means is cocked, said trigger means, when tripped such as by an animal within said cage, releasing said door means through said linkage means, whereby said door means snaps shut so as to trap the animal, wherein said trigger means comprises a pan hingedly disposed for rocking movement between two opposing sides of said cage above said floor, said linkage comprising a lever arm rigidly connected to said pan and extending exteriorly of said cage, and a single latching rod disposed exteriorly of said cage along one side thereof and coupled to said lever arm, said latching rod being operative upon any movement of said lever arm to swing from a latching position wherein said door means is released, wherein said separate top extends substantially the entire length of said cage and is removable and wherein each of said sides are hingedly attached to said bottom, said trap being collapsible upon removal of said top whereby each of said sides can be folded in superposition over said bottom.

5. A trap as defined in claim 4, wherein said sides and said bottom are constructed of wire mesh and wherein said top and said door means are constructed of sheet metal.

6. A trap as defined in claim 5, wherein a passage is provided in two opposing sides of said cage and wherein two door means are provided, one in each passage, said linkage means coupling said trigger means to each of said door means.

7. A live animal trap comprising a box-like cage having opposing substantially parallel pairs of sides a top and a floor, with a passage for entrance and egress to and from said cage in two opposing sides of said cage; foldable door means disposed in each said passage, each said door means being movable between a folded and collapsed configuration wherein the associated passage is open and an unfolded configuration wherein the associated passage is closed, each said door means normally being urged into said unfolded configuration via biasing means therefor; a single trigger means having a cocked and a tripped position disposed within said cage, and linkage means therefor coupling said single trigger means to each said door means such that each said door means may be individually retained in said folded configuration against the action of said biasing means when said trigger means is cocked, said trigger means, when tripped such as by an animal within said cage, releasing said door means through said linkage means, whereby each said retained door means snaps shut so as to trap the animal, wherein said trigger means comprises a pan hingedly disposed for rocking movement between two opposing sides of said cage above said floor, said linkage comprising a lever arm rigidly connected to said pan and extending exteriorly of said cage, and a single latching rod disposed exteriorly of said cage and coupled to said lever arm, said latching rod being operative upon any movement of said lever arm to swing from a latching position wherein both door means are released.

8. A trap as defined in claim 7, wherein each said door means comprises planar sections hingedly connected together along a fold axis with one of said sections being further hingedly coupled to said cage, said sections of each said door means being substantially coplanar whereby said associated passage is closed when said door means is in said unfolded configuration; and guide means in each said passage for slidably guiding each said door means between said folded and unfolded configurations such that each said door means is only collapsible inwardly toward the interior of said cage about said fold axis.

9. A trap as defined in claim 8, wherein said biasing means for said door means comprises a spring urging said two sections into a coplanar position whereat said door means is in said unfolded configuration.

10. A trap as defined in claim 7, wherein said top is removable and wherein each of said sides are hingedly attached to said bottom, said trap being collapsible upon removal of said top whereby each of said sides can be folded in superposition over said bottom.

11. A trap as defined in claim 8, wherein said guide means comprise a pair of elongated parallel vertical bars disposed to either side of said passage, said one of said sections of said door means being hingedly attached to one end of said vertical bars, another of said sections of said door means being loosely clamped above said vertical bars for sliding movement relative thereto.

12. A trap as defined in claim 8, wherein said sides and said bottom are constructed of wire mesh and wherein said top and said door means are constructed of sheet metal.

\* \* \* \* \*